A. R. KOSSBIEL.
LIGHT AND EXPOSURE GAGE.
APPLICATION FILED MAY 19, 1915.
1,183,571.
Patented May 16, 1916.
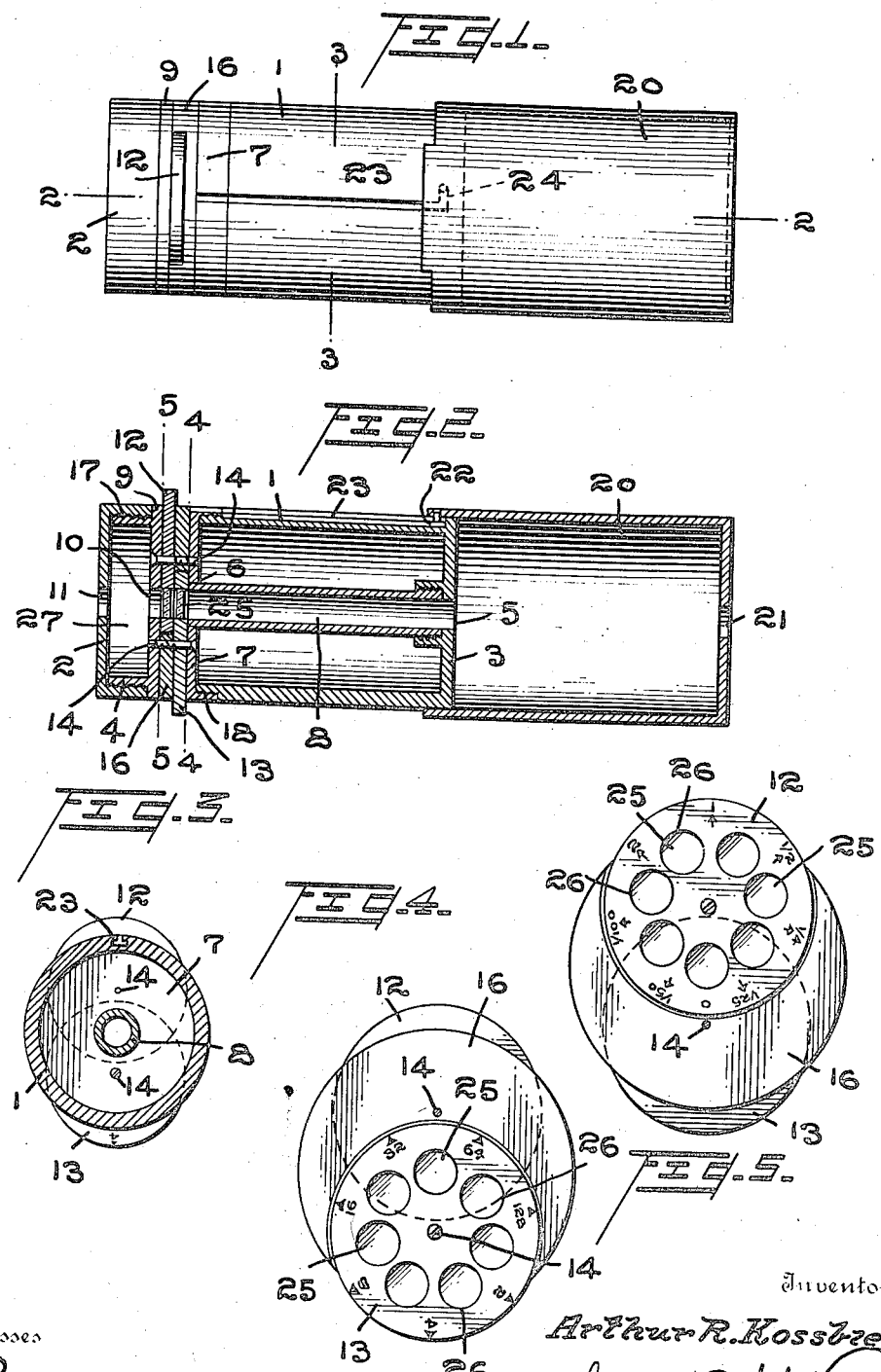

UNITED STATES PATENT OFFICE.

ARTHUR RUPERT KOSSBIEL, OF GREENFIELD, MASSACHUSETTS.

LIGHT AND EXPOSURE GAGE.

1,183,571.    Specification of Letters Patent.    Patented May 16, 1916.

Application filed May 19, 1915. Serial No. 29,054.

*To all whom it may concern:*

Be it known that I, ARTHUR RUPERT KOSSBIEL, a citizen of the United States, residing at Greenfield, in the county of Franklin and State of Massachusetts, have invented certain new and useful Improvements in Light and Exposure Gages, of which the following is a specification.

My invention relates to improvements in light and exposure gages, and more particularly to an improved apparatus for indicating the timing of photographic exposures, the object of the invention being to provide an apparatus of the character stated which will indicate the time of exposure in connection with any camera diaphragm, so that the photographer may know exactly how long to expose the negative with any diaphragm under any conditions. Heretofore, particularly with amateurs, the matter of time exposure with various diaphragms has been a matter of guess work, and most frequently results in poor pictures. With my improved apparatus, an amateur as well as a professional can ascertain without any guess work just the time of exposure in connection with any ordinary camera diaphragm, and the invention consists in certain features of construction and combinations and arrangements of parts as will be more fully hereinafter described and pointed out in the claims.

In the accompanying drawings: Figure 1 is a view in side elevation illustrating my improved apparatus in operative position. Fig. 2 is a view in longitudinal section. Fig. 3 is a view in transverse section on the line 3—3 of Fig. 1. Fig. 4 is a view in transverse section on the line 4—4 of Fig. 2, and Fig. 5 is a view in transverse section on the line 5—5 of Fig. 2.

1 represents a casing having ends 2 and 3. The end 2 is in the form of a cap internally screw-threaded, and screwed onto the threaded end of the casing as shown at 4. The end 3 is provided with an opening 5 which registers with an opening 6 in a partition 7, and these openings 5 and 6 are connected by a sight tube 8.

9 is a partition located in front of and spaced from the partition 7. This partition 9 and the removable end 2 are provided with registering openings 10 and 11 respectively which are in line with the sight tube 8. Between the partitions 7 and 9, two disks 12 and 13 respectively are mounted. These disks 12 and 13 have rotary mounting on pins or screws 14, and are positioned eccentrically to the longitudinal access of the casing, so that the disks at their inner portions overlap, and at their outer portions project beyond the wall of the casing, so that they can be conveniently turned by the frictional engagement of the finger or thumb thereupon. As the disks 12 and 13 are mounted eccentrically, it is necessary to provide filler pieces 16 which close the spaces between the disks, and the internal portions of the casing, and exclude light and shadow. As a convenient form of construction, I connect the partitions 7 and 9 with the disks and filler pieces between them, and provide screw-threaded flanges 17 and 18 to engage the end 2 and the body of the casing 1 respectively, so that the parts can be readily assembled or taken apart as may be desired.

20 represents a telescoping section which slides on casing 1, and is provided in one end with a sight opening 21 in line with a sight tube 8. The section 20 is provided with a headed pin 22, movable in a dove-tailed groove 23 in the wall of the casing and adapted to limit the movement of the telescoping section. It will be noted particularly by reference to Fig. 1, that the groove 23 at one end, has an off-set portion 24, so that the pin 22 can be turned into this off-set portion, and the sections securely held against movement.

The disk 13 I term the diaphragm disk, and the disk 12, I term the exposure disk, for reason which will hereinafter appear. Each disk contains transparent material graduated in density, and while this graduated material may take several different forms, I have illustrated the same as consisting of a circular series of independent disks 25 which are located in openings 26 in the disk, and the diaphragm and exposure disks are so located relative to each other that the disks of transparent material are caused to register in line with the sight tube 8 and the openings in the apparatus. In using the term "density," I use it to define the transparent quality of the material used in the light filter, and it is to be understood that each of the disks 26 will be of graduated thickness or otherwise constructed to vary the density so as to vary the quality of screen or filter for the penetration of light. At the edge of the diaphragm disk 13, I provide a scale showing in numerals the different diaphragms of cameras in common use and arranged in such a way that as that part of the filter which corresponds to a given diaphragm comes before a range of vision of the operator, its respective number becomes exposed to view on the part of the disk which protrudes from the casing 1.

On the edge of the disk 12, I locate a scale containing numbers and fractions indicating time exposures, and arrange the disk in such a way that as that part of the filter which corresponds to a given exposure comes before the range of vision of the operator, its respective number becomes exposed to view on the part of the disk which protrudes from casing 1.

In operation, the photographer first turns the diaphragm disk 13 until the number indicating the diaphragm he proposes to use appears at the center of the part of the disk which protrudes from casing 1. He then places his eye to the end of telescoping section 20 and sights through tube 8. While the instrument is in this position, he turns exposure disk 12 until the first ray of light penetrates through the line of sight. He then observes the scale appearing on the center of that part of the disk which protrudes from the casing 1, and this will give him the time of exposure according to the diaphragm.

With this particular apparatus, it will be noted that any amateur can tell without guess work just how long an exposure should be given in accordance with the light and in accordance with the diaphragm employed.

That portion of the casing located between the end 2 and partition 9, I term a light chamber 27. This chamber prevents any cross rays of light from entering the casing through the opening 10 into the intermediate portion of the casing, and permits the filters to properly perform their functions.

While I have described my invention as of a particular construction, I would have it understood that I might change the form of the casing, the particular manner and arrangement of the disks, and other details of construction without departing from my invention, and hence I do not limit myself to the precise details set forth but consider myself at liberty to make such changes and alterations as fairly fall within the spirit and scope of the appended claims.

Having thus described my invention, what I claim as new and desire to secure by Letters Patent is:

1. A device of the character described, comprising a casing having openings in its ends, of two members in the casing having their surfaces overlapping, filters in the members registering in line with the openings in the casing, said filters of graduated density, and said members having exposed scales thereon, one of said scales indicating diaphragms and the other time exposures, substantially as described.

2. A device of the character described, comprising a casing having openings in its ends, of two disks mounted in the casing and having their surfaces overlapping, filters in the disks registering in line with the openings in the casing, said filters of graduated density, and said disks having exposed scales thereon, one of said scales indicating diaphragms and the other time exposures, substantially as described.

3. A device of the character described, comprising a casing having openings in its ends, of two disks mounted eccentrically in the casing and having their surfaces overlapping, filters in the disks registering in line with the openings in the casing, said filters of graduated density, said disks projecting beyond the surface of the casing and having scales thereon, one of said scales indicating diaphragms and the other time exposures, substantially as described.

In testimony whereof I have signed my name to this specification in the presence of two subscribing witnesses.

ARTHUR RUPERT KOSSBIEL.

Witnesses:
J. W. GERMON,
H. RALPH RINGE